Patented May 5, 1942

2,282,250

UNITED STATES PATENT OFFICE 2,282,250

VALUABLE VAT DYESTUFFS OF THE DIBENZANTHRONE AND ISODIBENZANTHRONE SERIES

Otto Schlichting and Adolf Hrubesch, Ludwigshafen-on-the-Rhine, Germany, assignors, by mesne assignments, to General Aniline & Film Corporation, New York, N. Y., a corporation of Delaware No Drawing. Application May 28, 1940, Serial No. 337,662. In Germany June 24, 1939

6 Claims. (Cl. 260—353)

The present invention relates to new valuable vat dyestuffs of the dibenzanthrone and isodibenzanthrone series, in particular to vat dyestuffs of the Bz2,Bz2'-diethyldibenzanthrone and the Bz2,Bz2'-diethylisodibenzanthrone series, and a process of producing same.

We have found that valuable vat dyestuffs of the dibenzanthrone and isodibenzanthrone series can be obtained by treating Bz2-ethylbenzanthrone, Bz2,Bz2'-diethyl-Bz1,Bz1'-dibenzanthronyl or Bz2,Bz2'-diethyldibenzanthronylsulfide with alkaline condensing agents at elevated temperature and, if desired, allowing halogenating agents to act on the resulting vat dyestuffs.

Suitable alkaline condensing agents are, for example, sodium or potassium hydroxide or mixtures thereof. It is preferable to carry out the treatment with alkaline condensing agents in the presence of an alcohol, such as methanol, ethanol or butanol. The reaction temperatures may be varied within wide limits; the best results, however, are obtained by working at temperatures between 120 and 220° C.

For the purpose of halogenating the vat dyestuffs obtained by the alkali treatment they are brought into reaction either with free halogen, such as chlorine or/and bromine, or with compounds splitting off halogen under the reaction conditions, such as sulphuryl chloride, chlorsulfonic acid, ferric chloride or aluminium chloride. The halogenation may be carried out in the presence of organic solvents or diluents, such as trichlorbenzene or nitrobenzene, or of inorganic solvents, such as sulphuric acid, oleum, chlorsulphonic acid and the like, or also in aqueous suspension. In many cases it is preferable to employ promoters for halogenation, such as iodine, sulphur, selenium, iron, antimony and the like. Depending on the reaction conditions and the quantity of the halogenating agents employed there are obtained vat dyestuffs containing from one to four or more halogen atoms. By employing different halogenating agents there are obtained vat dyestuffs containing different halogen atoms, for example chlorine and bromine, in the same vat dyestuff molecule.

The dyestuff obtained by alkali treatment of Bz2-ethylbenzanthrone and Bz2,Bz2'-diethyl-Bz1,Bz1'-dibenzanthronyl is Bz2,Bz2'-diethyldibenzanthrone, dyeing vegetable fibers pure blue shades, whereas the unsubstituted dibenzanthrone or Bz2,Bz2'-dimethyldibenzanthrone dyes reddish blue shades. The end product of the alkali treatment of Bz2,Bz2'-diethyl-Bz1,Bz1'-dibenzanthronylsulfide is Bz,Bz2'-diethylisodibenzanthrone. The halogenated Bz2,Bz2'-diethyldibenzanthrones dye vegetable fibers violet-grey shades whereas the corresponding halogenated dibenzanthrone dyes greenish blue; the halogenated Bz2,Bz2'-diethylisodibenzanthrones produce on vegetable fibers still more bluish shades than the unhalogenated compounds; in particular, the brominated Bz2,Bz2'-diethylisodibenzanthrones obtained by bromination of Bz2,Bz2'-diethylisodibenzanthrone in chlorsulphonic acid dye vegetable fibers clear navy blue shades whereas the brominated isodibenzanthrones unsubstituted in the Bz2 and Bz2' position dye violet shades. As a rule we found that by halogenating Bz2,Bz2'-diethylisodibenzanthrone in organic diluents, such as trichlorbenzene or nitrobenzene, there are obtained vat dyestuffs which dye more greyish shades than the dyestuffs obtained by halogenating in inorganic solvents, such as chlorsulphonic acid or oleum. Furthermore, the brominated dyestuffs dye in many cases clearer shades of color than the chlorinated dyestuffs.

The new dyestuffs are clearly distinguished from similar known dyestuffs in that they produce dyeings which are not sensitive to spotting with water, have a good fastness to ironing, do not change their shade of color when washed or kier-boiled or treated with oxidizing agents, such as hydrogen peroxide, and are in many cases faster to weather than the corresponding known dyestuffs lacking the ethyl groups in Bz2 and Bz2'-position.

The following examples will further illustrate how the said invention may be carried out in practice, but the invention is not restricted to these examples. The parts are by weight.

*Example 1*

50 parts of Bz2-ethylbenzanthrone (melting point 119°) are introduced at 100° C. into a melt of 500 parts of potassium hydroxide and 200 parts of methanol while stirring and the reaction temperature is raised within 2 hours to 180° C. whereby a part of the methanol employed is distilled off. The reaction mixture is stirred at 180° C. for 2 hours, then at 210° C. for half an hour and subsequently allowed to cool at 100° C., diluted with water, and, after adding some sodium hydrosulphite, filtered off. Air is led through the filtrate until the dyestuff has separated out and the precipitate is filtered off by suction, washed with hot water until neutral and dried. After recrystallizing the product from trichlorbenzene, the Bz2,Bz2'-diethyldibenzanthrone is obtained in form of a bluish violet crystal powder having a bronze-colored luster and a melting point of above 360° C. It dissolves in concentrated sulphuric acid giving a red-violet coloration, in organic solvents, such as benzene, xylene and halogenbenzenes giving a red-violet coloration and a strong red fluorescence, in alcohols giving a blue-violet and in glacial acetic acid giving a blue coloration. It dyes vegetable fibers from a pure blue vat navy blue shades which are not sensitive to spotting with water and have a very good fastness to ironing.

*Example 2*

10 parts of Bz2,Bz2'-diethyl-Bz1,Bz1'-dibenzanthronyl obtained by oxidation of Bz2-ethylbenzanthrone dissolved in 80 per cent sulphuric acid with manganese dioxide at from 50 to 60° C.; orange colored crystals showing the melting point of 288° C.) are introduced into a 100° C. hot melt of 100 parts of potassium hydroxide and 50 parts of methanol while stirring. The temperature is then raised to 140° C. within an hour and stirring is continued at this temperature for from 2 to 3 hours. The reaction mixture is then poured into water and air is led through the suspension thus obtained. The precipitate is then filtered off by suction, washed with water until neutral and dried. The dyestuff thus obtained in a very good yield is identical with that obtained according to Example 1.

*Example 3*

A mixture of 50 parts of Bz2-ethyl-Bz1-brombenzanthrone (obtained by brominating Bz2-ethylbenzanthrone in nitrobenzene at from 70 to 80° C.; yellow needles with a melting point of from 195 to 196° C.) and 1200 parts of a 10 per cent aqueous solution of sodium sulfide, containing dissolved some sulphur, is heated in a closed vessel at from 130 to 140° C. while stirring until a sample contains no longer bromine. The reaction mixture is then allowed to cool, the separated precipitate is filtered off by suction, washed with water until neutral and dried. The Bz2,Bz2'-diethyl-Bz1,Bz1'-dibenzanthronylsulfide thus obtained in form of a yellow crystal powder has a melting point of from 333 to 336° C. After recrystallization from trichlorbenzene there are obtained yellow leaflets melting at 338° C.

125 parts of the Bz2,Bz2'-diethyl-Bz1,Bz1'-dibenzanthronylsulfide thus obtained are introduced at from 100 to 110° C., while stirring into a melt prepared from 1000 parts of potassium hydroxide and 500 parts of methanol. The temperature of the reaction mixture is then raised to 160° C. within one hour and stirring is continued at this temperature about 3 hours. After cooling to about 120° C. the melt is poured into water and the suspension is shortly boiled while leading through air. The separated blue dyestuff is then filtered off by suction, washed with hot water until neutral and dried. The Bz2,Bz2'-diethylisodibenzanthrone is thus obtained in a quantitative yield and excellent purity. It dissolves in concentrated sulphuric acid giving a green coloration and in nitrobenzene and halogenbenzenes giving a red-violet coloration and a strong orange-red fluorescence; it is difficultly soluble in alcohols, acetone and ether. Cotton is dyed with the new dyestuff from a blue vat brilliant blue-violet, good levelled shades. The dyeings are not sensitive to spotting with water and have a good fastness to ironing. Furthermore the shade of color is not changed, if the dyeings are washed, kier-boiled or treated with a dilute aqueous solution of hydrogen peroxide.

*Example 4*

100 parts of Bz2,Bz2' - diethylisodibenzanthrone (obtained according to Example 3) are dissolved in a solution of 1.3 parts of sulphur in 1000 parts of chlorsulphonic acid. 33 parts of bromine are then allowed to drop into this solution at from 20 to 25° C. and stirring is continued until free bromine can no longer be detected. The reaction mixture is then diluted with 1000 parts of 96 per cent sulphuric acid, poured onto ice and the separated blue dyestuff is filtered off by suction, washed with water until neutral and dried. The dibrom-Bz2,Bz2'-diethylisodibenzanthrone thus obtained is a dark blue powder which dissolves in concentrated sulphuric acid giving a green coloration and dyeing cotton from a blue vat clear navy blue shades. The dyeings are not sensitive to spotting with water and have a good fastness to ironing and to weather.

Similar dyestuffs are obtained if instead of sulphur other catalysts, such as iodine or antimony, are employed or the bromination is carried out without addition of any catalyst.

*Example 5*

20 parts of Bz2,Bz2'-diethyldibenzanthrone (obtained according to Example 1) are dissolved in a solution of 0.3 part of sulphur in 200 parts of chlorsulphonic acid and 7 parts of bromine are allowed to flow into this solution at from 20 to 25° C. while stirring. Stirring is continued at this temperature for about 10 hours and the reaction mixture is worked up as described in Example 4. The dibrom-Bz2,Bz2'-diethyldibenzanthrone thus obtained is a dark violet powder which dissolves in concentrated sulphuric acid giving a red-violet coloration. It dyes cotton from a blue vat grey-violet shades which are not sensitive to spotting with water and have good fastness to ironing.

Employing 10 parts of bromine instead of 7 parts as described in the foregoing paragraph, there is obtained a vat dyestuff which dyes cotton somewhat more reddish grey-violet.

*Example 6*

A mixture of 40 parts of sulphurylchloride and 40 parts of nitrobenzene are allowed to flow into a suspension of 20 parts of Bz2,Bz2'-diethylisodibenzanthrone in 200 parts of nitrobenzene at 70° C. and stirring is continued for 2 hours at 70° C. and then for 2 hours at 120° C. After cooling the separated dyestuff is filtered off by suction, washed with nitrobenzene and methanol and dried. A dark blue powder is thus obtained which represents according to analysis a tetrachlor - Bz2,Bz2' - diethylisodibenzanthrone. It dyes cotton from a blue vat greyish violet shades which are not sensitive to spotting with water.

*Example 7*

A mixture of 25 parts of Bz2,Bz2'-diethylisodibenzanthrone, 3.5 parts of iodine and 250 parts of nitrobenzene is heated at 150° C. while stirring and a mixture of 24 parts of bromine and 70 parts of nitrobenzene are allowed to flow into it. After stirring for 8 hours at 150° C. the reaction mixture is allowed to cool and diluted with 250 parts of methanol. The dyestuff separating out is filtered off by suction, washed with methanol and dried. The dibrom-Bz2,Bz2'-diethylisodibenzanthrone thus obtained is a dark blue powder which dyes vegetable fibers from a violetish blue vat neutral grey shades which are not sensitive to spotting with water and show a good fastness to ironing.

*Example 8*

A solution of 12.5 parts of Bz2,Bz2'-diethyldibenzanthrone and 1.2 parts of iodine in 250 parts of 96 percent sulphuric acid is heated at 100° C. and 12 parts of bromine are allowed to flow into it while stirring. After stirring at 180° C. for about 6 hours, the reaction mixture is allowed to cool and poured into water. The separated dyestuff is filtered off by suction, washed with water, then with a dilute aqueous solution of sodium bisulphite, after this washed with water again and then dried. The dyestuff thus obtained dyes cotton from a blue vat brownish violet shades.

*Example 9*

9 parts of bromine are allowed to drop into a suspension of 13 parts of Bz2,Bz2'-diethylisodibenzanthrone in 250 parts of water at from 20 to 25° C. while stirring. After stirring at room temperature for about 20 hours, the dyestuff is filtered off by suction, washed with water until neutral and dried. A monobrom-Bz2,Bz2'-diethylisodibenzanthrone is thus obtained which dyes cotton from a blue vat in navy blue shades being not sensitive to spotting with water.

*Example 10*

10 parts of bromine are allowed to flow into a solution of 10 parts of Bz2,Bz2'-diethylisodibenzanthrone and 1 part of iodine in 100 parts of chlorsulphonic acid at from 20 to 25° C. while stirring. Stirring is continued at this temperature until free bromine can no longer be detected. After working up in the manner described in Example 4, a monochlor-tribrom-Bz2,Bz2'-diethylisodibenzanthrone is obtained as a violet powder dissolving in concentrated sulphuric acid with an olive-green color and dyeing cotton from a blue vat clear navy blue shades which are not sensitive to spotting with water and exhibit a good fastness to ironing.

What we claim is:

1. The process which comprises treating a compound selected from the class consisting of Bz2-ethylbenzanthrone, Bz2,Bz2' - diethyl-Bz1,-Bz1'-dibenzanthronyl and Bz2,Bz2'-diethyl-Bz1,-Bz1'-dibenzanthronylsulfide with alkaline condensing agents at elevated temperature.

2. The process which comprises treating a compound selected from the class consisting of Bz2-ethylbenzanthrone, Bz2,Bz2'-diethyl - Bz1,-Bz1'-dibenzanthronyl and Bz2,Bz2'-diethyl-Bz1,-Bz1'-dibenzanthronylsulfide with alkaline condensing agents at elevated temperature and halogenating the vat dyestuffs thus obtained.

3. A vat dyestuff of the class consisting of Bz2,-Bz2'-diethyldibenzanthrone and Bz2,Bz2'-diethylisodibenzanthrone wherein up to four positions are occupied by halogen atoms selected from the class consisting of chlorine and bromine, the remaining positions by hydrogen.

4. The Bz2,Bz2'-diethylisodibenzanthrone dyeing vegetable fibers from a blue vat brilliant blue-violet shades not sensitive to spotting with water.

5. A dibrom-Bz2,Bz2' - diethylisodibenzanthrone dissolving in concentrated sulphuric acid giving a green coloration and dyeing vegetable fibers from a blue vat in navy blue shades not sensitive to spotting with water.

6. A monochlor-tribrom-Bz2,Bz2'-diethylisodibenzanthrone dissolving in concentrated sulphuric acid with an olive-green color and dyeing vegetable fibers from a blue vat clear navy blue shades not sensitive to spotting with water.

OTTO SCHLICHTING.
ADOLF HRUBESCH.

CERTIFICATE OF CORRECTION.

Patent No. 2,282,250.　　　　　　　　　　　　　　May 5, 1942.

OTTO SCHLICHTING, ET AL.

It is hereby certified that error appears in the printed specification of the above numbered patent requiring correction as follows: Page 1, second column, line 1, after "benzanthrone" and before the period insert the comma and words --, dyeing vegetable fibers more bluish violet shades than isodibenzanthrone or Bz2, Bz2'-dimethylisodibenzanthrone--; and that the said Letters Patent should be read with this correction therein that the same may conform to the record of the case in the Patent Office.

Signed and sealed this 28th day of July, A. D. 1942.

Henry Van Arsdale,
　　　　　　　　　　　　　　　　　　　Acting Commissioner of Patents.

(Seal)